(12) United States Patent
Chen (10) Patent No.: US 9,952,430 B2
(45) Date of Patent: Apr. 24, 2018

(54) LEVER ASEIMATIC REFLECTION SHEET DEVICE

(71) Applicant: E-LEAD ELECTRONIC CO., LTD., Changhua (TW)

(72) Inventor: Stephen Chen, Changhua (TW)

(73) Assignee: E-LEAD ELECTRONIC CO., LTD., Changhua (TW)

( * ) Notice: Subject to any disclaimer, the term of this patent is extended or adjusted under 35 U.S.C. 154(b) by 38 days.

(21) Appl. No.: 14/989,429

(22) Filed: Jan. 6, 2016

(65) Prior Publication Data

US 2017/0192233 A1 Jul. 6, 2017

(51) Int. Cl.
G02B 7/182 (2006.01)
G02B 27/01 (2006.01)
G02B 7/00 (2006.01)

(52) U.S. Cl.
CPC ......... *G02B 27/0149* (2013.01); *G02B 7/001* (2013.01); *G02B 27/0101* (2013.01); *G02B 2027/013* (2013.01); *G02B 2027/0169* (2013.01)

(58) Field of Classification Search
CPC ........... B60R 1/078; B60R 1/082; B60R 1/10; B60R 1/06; B60R 1/0605; B60R 1/04; B60R 1/12; B60R 1/072; G02B 7/1824; G02B 7/182; G02B 7/1825; G02B 7/1827
USPC .......................................... 359/631, 838–884
See application file for complete search history.

(56) References Cited

U.S. PATENT DOCUMENTS

| | | | | |
|---|---|---|---|---|
| 5,386,322 A * | 1/1995 | Parsons | ................. | G02B 7/182 248/477 |
| 8,967,569 B2 * | 3/2015 | Hsu | ....................... | F16M 11/10 16/233 |
| 2008/0192417 A1 * | 8/2008 | Hwang | ............... | F16M 11/105 361/679.06 |
| 2014/0085798 A1 * | 3/2014 | Myerchin | ............ | F16M 11/046 361/679.22 |
| 2014/0265765 A1 * | 9/2014 | Khodapanah | ......... | F16M 13/02 312/223.1 |

* cited by examiner

*Primary Examiner* — Thomas K Pham
*Assistant Examiner* — Vipin Patel
(74) *Attorney, Agent, or Firm* — Guice Patents PLLC (57) ABSTRACT

The invention relates to a lever aseimatic reflection sheet device, which includes a base, a leverage board and a reflection sheet device. Elastic torque of a first elastic element is provided to force the reflection sheet to touch against the windshield W with the leverage board used as rotation center of the lever, so that the reflection sheet would not be affected by vibration of vehicle dashboard, to thereby improve fastening and supporting stability of the reflection sheet.

17 Claims, 6 Drawing Sheets

LEVER ASEIMATIC REFLECTION SHEET DEVICE

BACKGROUND OF THE INVENTION a) Field of the Invention

The invention relates to a lever aseimatic reflection sheet device and, more particularly, to an aseimatic reflection sheet device used in a vehicle head-up display device, the lever action is applied to improve its aseimatic capacity that it would not be affected by vibration of vehicle dashboard, to thereby improve fastening and supporting stability of the reflection sheet.

b) Description of Prior Art

There are more and more information in vehicle, it is dangerous that drivers usually take their eyes off the road to read information during driving. In order to solve the drawbacks, head-up displays are developed, so that drivers may simultaneously read information and pay attention on the road conditions ahead. Especially the head-up display using concave mirror for imaging, display area may be enlarged and the distance from the displayed image to drivers' eyes is far enough, usually greater than 2 meters. When drivers see the displayed information, focal length of eyes is near drivers' line of sight for watching road conditions, so that drivers may pay attention on the road during reading information, the danger of driving may be reduced significantly.

The virtual imaging is imaged by using a concave mirror, the imaging formula (of concave mirror) is: $1/p+1/q=1/f$, wherein f is focal distance, q is object distance, p is image distance. Virtual images may be enlarged in a general magnification, and the distance of virtual image may simultaneously be become farer in the same ratio, between four to six times, thus, readers may be in the best condition. If magnification is too large, readers may feel dizzy easily, so that the distance between the virtual image and drivers' eye may be larger than 2 meters, and the location of image may be in the rear of the reflection sheet with distance larger than 1.2 meters, namely, distance of optical path from display to concave mirror may be larger than 24 cm (if the magnification is five times). Besides, distance of optical path may be increased by reflecting back and forth through mirror surface, but the volume needed by optical path is large, so a space is usually reserved for head-up display device inside the vehicle dashboard.

This method may only be used if the original manufacturer reserves desired space at design time. For the market of installation, the head-up display cannot be installed on the vehicle dashboard because the size is too large with optical path device, even may obstruct drivers' line of sight.

Another solution for optical path device with large size is separating it that the display is fixed on the top of the windshield and the reflection sheet is fixed on vehicle dashboard. However, vehicle dashboards in many vehicles may shock due to rotation of engine or air conditioning compressor, and the reflection sheet fixed on the top may be shocked. Also, the displacement of shocking may be enlarged due to enlarge effect of concave mirror, and displayed image may shocked severely.

In order to solve the problem of the reflection sheet being shocked, the inventor of the present invention refers to the cited references TW publication no. 530961, TW M273183, TW M375372, TW publication no. 576080, TW I352165, TW M288937, TW M275639 etc., and found that for the problem that the conventional reflection sheet being shocked, the related technical content and applications still have technical bottlenecks.

For the shaking problem of the reflection sheet, although the reflection sheet could be closely against the windshield by elasticity of elastic element to resist inertia of vibration, the effect is limited. Elasticity of the elastic element is not changed, inertia of vibration with different strength is dynamic, thus, the shaking problem could be overcome if elasticity of the elastic element is larger than maximum of inertia of vibration. However, if there is no vibration, elasticity of the elastic element only causes deformation of the reflection sheet, so it is not a good solution.

SUMMARY OF THE INVENTION

In view of this, the inventor finally completes a lever aseismatic reflection sheet device of the present invention after numerous improvements, namely, the object of the present invention is to provide a reflection sheet device with applying the lever action for improving aseimatic capacity, to achieve the purpose that the reflection sheet would not be affected by vibration of vehicle dashboard, to thereby improve fastening and supporting stability of the reflection sheet.

To achieve the object, the first embodiment of the lever aseimatic reflection sheet device of the present invention includes:

a base;

a leverage board, a first shaft group and a second shaft group are set on the leverage board, the first shaft group includes a first elastic element and a first shaft, the first elastic element is slipped on the first shaft, the first shaft is set on a side of the leverage board and the base, the first elastic element is located between and touched the base and the leverage board to provide elastic torque for rotation;

a reflection sheet, the second shaft group is set between a bottom side of the reflection and another end of the leverage board.

The base further includes a base plate, the base plate is set on a bottom of the base, a double-sided adhesive tap set under the base plate is provided to stick on a dashboard.

The reflection sheet, a damping block is set on its top side, the damping block is provided to touch on a windshield, to reduce shaking of the reflection sheet.

The second shaft group is a hinge.

The second shaft group includes a second elastic element and a second shaft.

The lever aseimatic reflection sheet device of the present invention further includes an angle adjusting mechanism, the angle adjusting mechanism includes a supporting block, an angle adjusting rod and an adjusting hole, the supporting block is set on an end of a bottom side of the leverage board, the adjusting hole is set on the reflection sheet, the angle adjusting rod is provided to be revolved into the adjusting hole, the length of the part passing over the adjusting hole and touching the supporting block is used to provide a flip angle of the reflection sheet for limit adjustment.

The reflection sheet is a translucent and semi-reflective concave mirror.

The second embodiment of the lever aseimatic reflection sheet device of the present invention, including:

a base;

a leverage board, a first shaft group and a second shaft group are set on the leverage board, the first shaft group includes a first elastic element and a first shaft, the first elastic element is slipped on the first shaft, the first shaft is set on a side of the leverage board and the base;

a counterweight, which is set on an end of the leverage board;

a reflection sheet, the second shaft group is set between a bottom side of the reflection and another end of the leverage board.

An engagement is set on an end of the leverage board for fastening the reflection sheet.

The base further includes a base plate, the base plate is set on a bottom of the base, a double-sided adhesive tap set under the base plate is provided to stick on a dashboard.

The reflection sheet, a damping block is set on its top side, the damping block is provided to touch on a windshield, to reduce shaking of the reflection sheet.

The second shaft group is a hinge.

The second shaft group includes a second elastic element and a second shaft.

The lever aseimatic reflection sheet device of the present invention further includes an angle adjusting mechanism, the angle adjusting mechanism includes a supporting block, an angle adjusting rod and an adjusting hole, the supporting block is set on an end of a bottom side of the leverage board, the adjusting hole is set on the reflection sheet, the angle adjusting rod is provided to be revolved into the adjusting hole, the length of the part passing over the adjusting hole and touching the supporting block is used to provide a flip angle of the reflection sheet for limit adjustment.

The reflection sheet is a translucent and semi-reflective concave mirror.

DETAILED DESCRIPTION OF THE INVENTION

Figure 1:
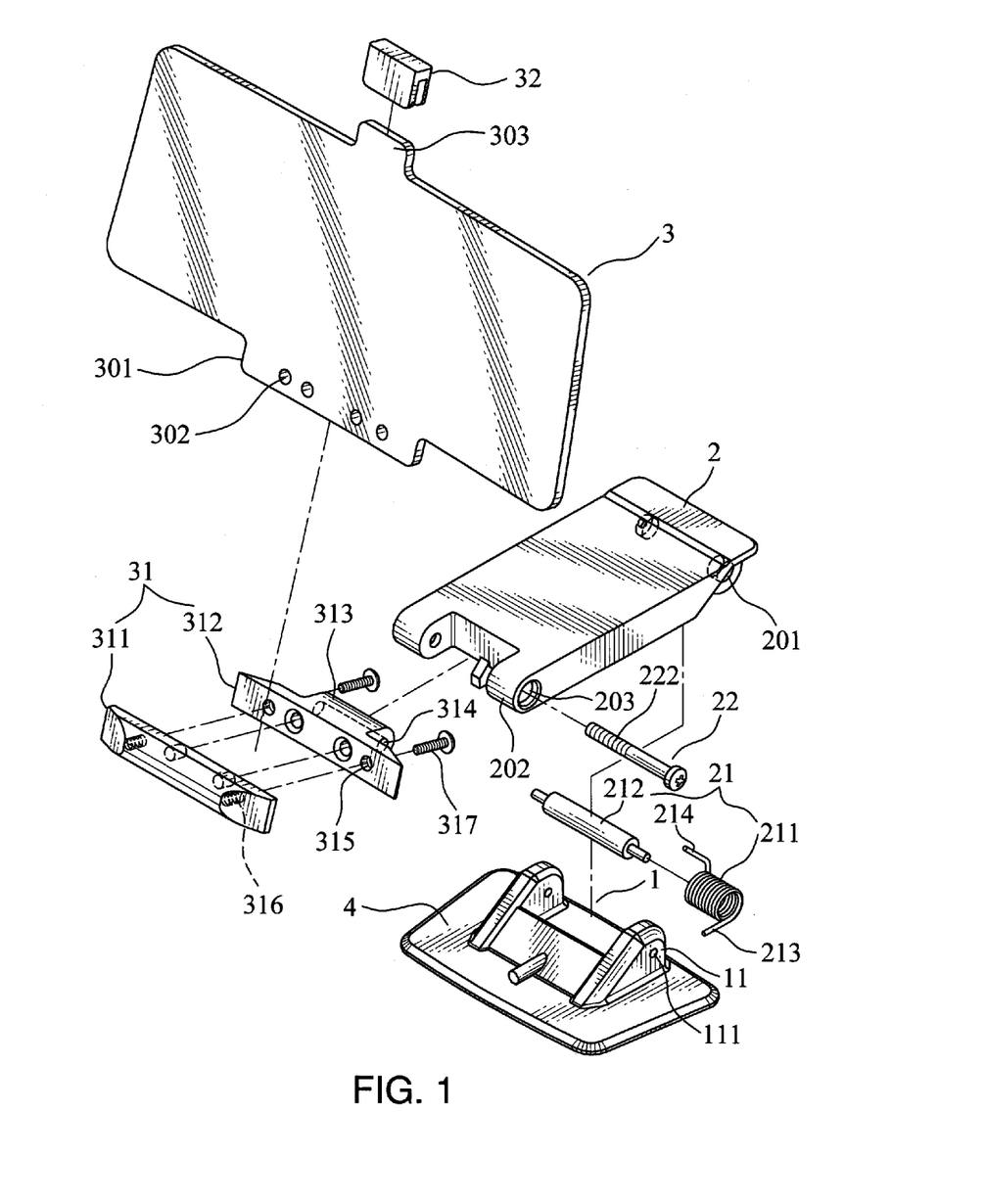
FIG. 1 is a three-dimension exploded diagram of the first embodiment of the present invention.
Figure 2:
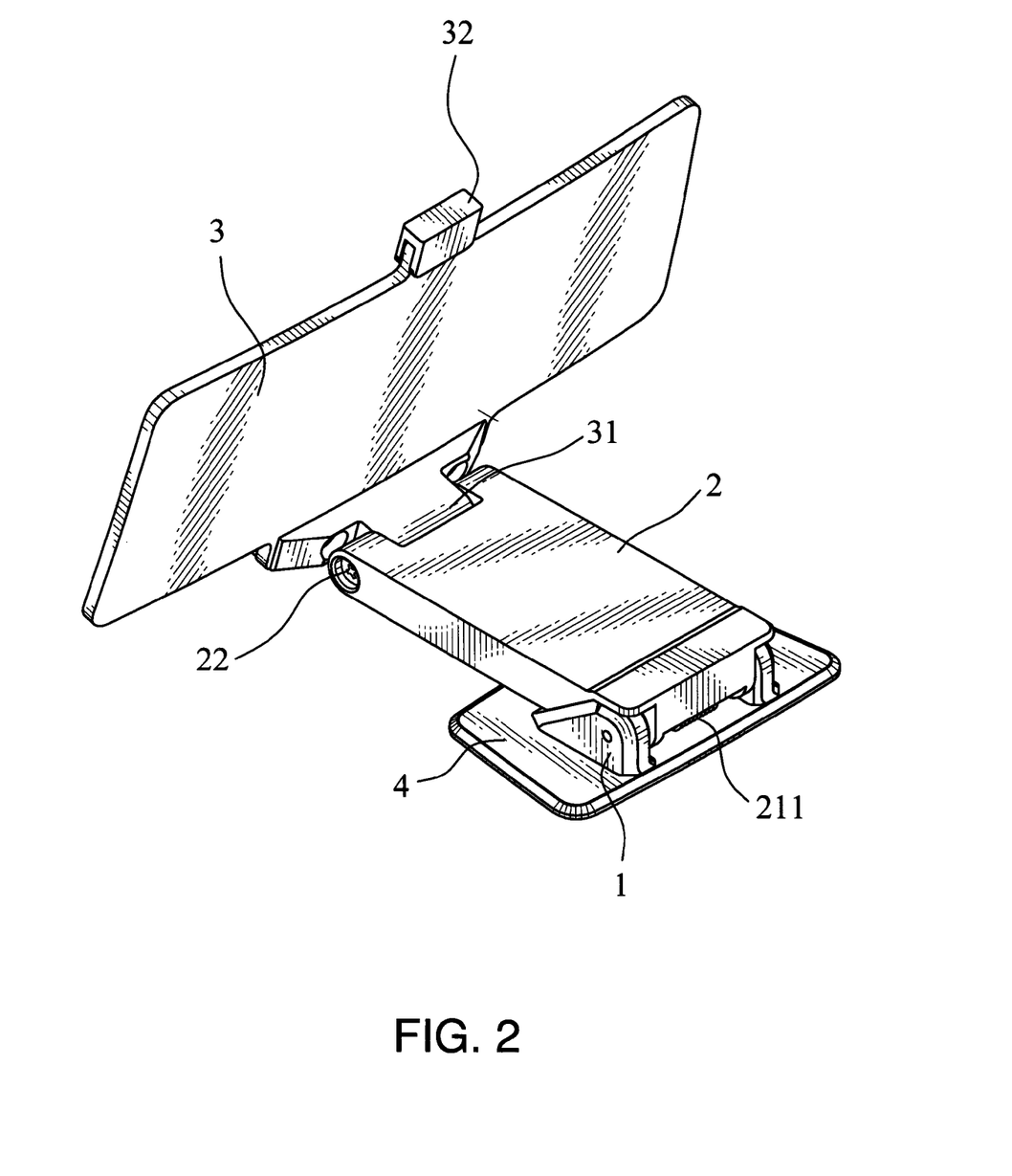
FIG. 2 is a three-dimension diagram of the first embodiment of the present invention.
Figure 3:
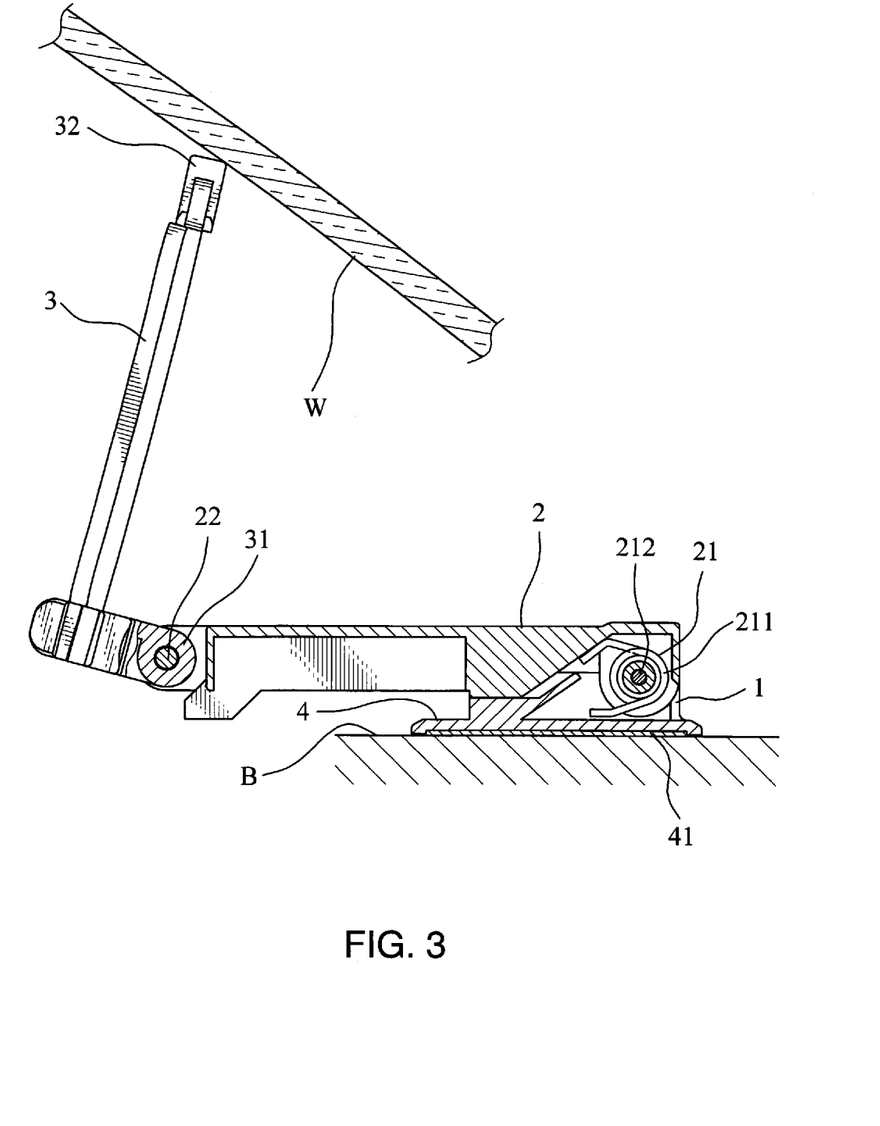
FIG. 3 is a cross-sectional diagram of the first embodiment of the present invention.

Please refer to FIG. 1, FIG. 2, FIG. 3, which is the first embodiment of the aseimatic reflection sheet device of the present invention, including a base 1, a leverage board 2 and a reflection sheet 3.

The base 1, two corresponding first arms 11 are set on it, a first shaft hole 111 is set on each first arm 11.

The leverage board 2, a second shaft hole 201 is set on its one side, two corresponding second arms 202 are set on another side of the leverage board 2, a third hole 203 is set on the second arm 202. A first shaft group 21 and a second shaft group 22 are set on the leverage board 2, the first shaft group 21 includes a first elastic element 211 and a first shaft 212, the first elastic element 211 is slipped on the first shaft 212, the first shaft 212 is inserted into the second shaft hole 201 on a side of the leverage board 2 and the first shaft hole 111 of the base 1. Two pins 213, 214 of the first elastic element 211 are respectively located between and touched the base 1 and the leverage board 2 to provide elastic torque for rotation, the first elastic element 211 is a torsion spring.

The reflection sheet 3 is a translucent and semi-reflective concave mirror, virtual image from the concave mirror may be enlarged and also the virtual image may become farer. A clamping portion 301 is set on the bottom of the reflection sheet 3, multiple first through holes 302 set on the clamping portion 301 is provided to fasten a flipped block 31 on the bottom side of the reflection sheet 3. The flipped block 31 is consisted of a front jaw 311 and a rear jaw 312. A flange portion 313 is extended from a side of the rear jaw 312. A fourth shaft hole 314 is set on the flange portion 313, the second shaft group 22 is provided as a hinge passing through the third shaft hole 203 on another end of the leverage board 2 and the fourth shaft hole 314 of the flipped block 31 on the bottom of the reflection sheet 3. By the elastic torque generated due to vibration of the first elastic element 221, a leverage moment is formed between the leverage board 2 and the flipped block 31 to let the reflection sheet 3 be touched against a windshield W to improve fastening and supporting stability of the reflection sheet. If there is no vibration, no elasticity may be forced on the reflection sheet 3 from the first elastic element 211, thus, deformation of the reflection sheet 3 may be effectively prevented.

The second shaft group 22 includes a second shaft 222, the second shaft 222 is a locking bolt, which may be provided to fasten when adjusting the angle between the reflection sheet 3 and the leverage board 2.

The flipped block 31, multiple second through holes 315 are set on its rear jaw 312, the second through holes 315 are corresponding to internal threads 316 set on the front jaw 311 and the first through holes 302 for a bolt 317 passing through and being fastened, to thereby fix the flipped block 31 on the bottom side of the reflection sheet 3.

The base 1 further includes a base plate 4, the base plate 4 is set on a bottom of the base 1, a double-sided adhesive tap 41 set under the base plate 4 is provided to stick on a dashboard B.

The reflection sheet 3, a damping block 32 is set on its top, which is a soft material. The damping block 32 is fixed on a top side 303 of the reflection sheet 3. The damping block 32 is touched against the windshield W to reduce shaking of the reflection sheet 3.

Figure 4:
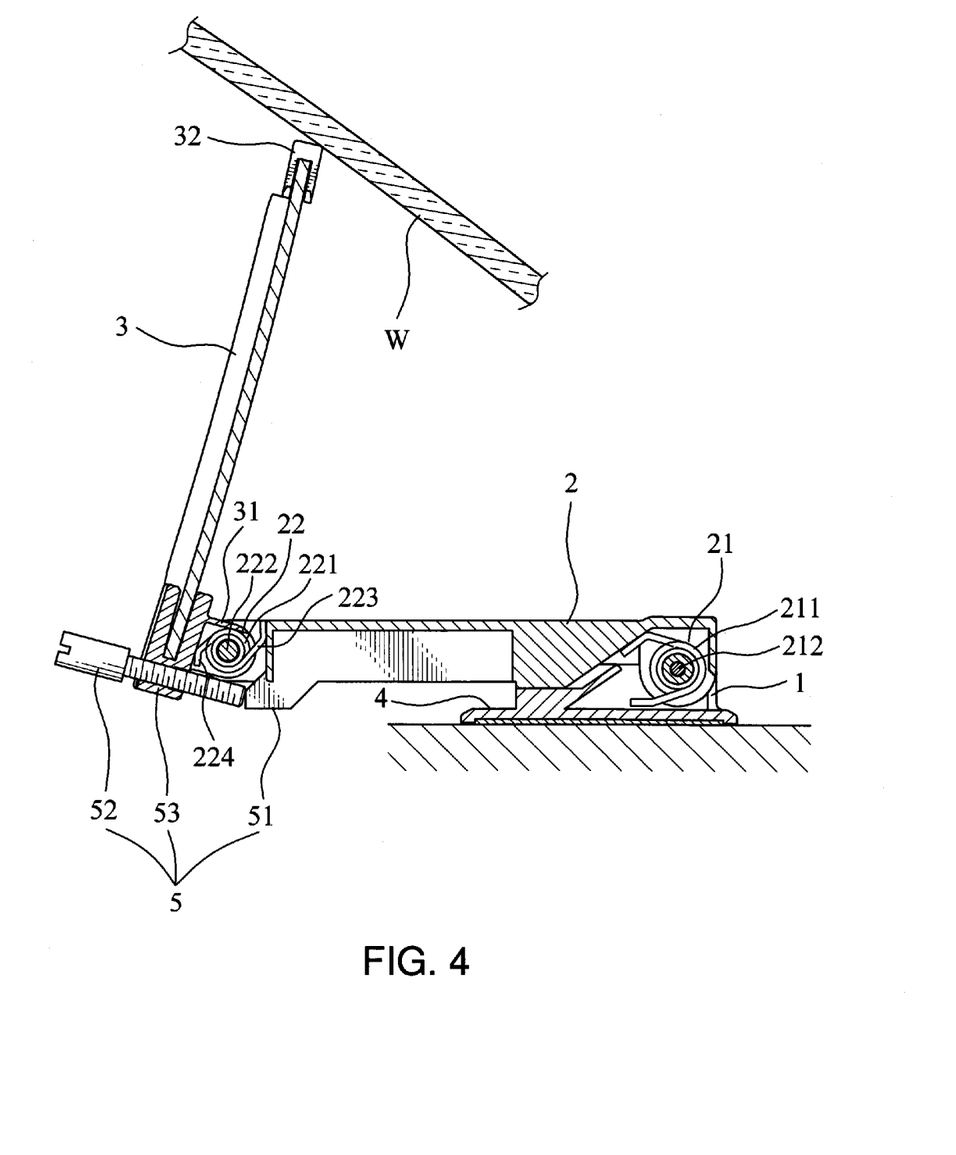
FIG. 4 is a schematic diagram of another example of the second shaft group the first embodiment of the present invention.

As shown in FIG. 4, which is another example of the second shaft group 22, wherein the second shaft group 22 includes a second elastic element 221 and a second shaft 222, the second elastic element 221 is slipped on the second shaft 222, the second shaft 222 is passing through the third shaft hole 203 on an end of the leverage board 2 and the fourth shaft hole 314 of the flipped block 31 on the bottom of the reflection sheet 3, two pins 223, 224 of the second elastic element 221 are respectively touched and located between the leverage board 2 and the flipped block 31 of the reflection sheet 3 to provide elastic torque for rotation, so that aseimatic function of the reflection sheet 3 may be improved, the second elastic element 221 is a torsion spring.

As shown in FIG. 4, the lever aseimatic reflection sheet device of the present invention further includes an angle adjusting mechanism 5, the angle adjusting mechanism 5 includes a supporting block 51, an angle adjusting rod 52 and an adjusting hole 53, the supporting block 51 is set on an end of a bottom side of the leverage board 2, the adjusting hole 53 is set on the reflection sheet 3, the angle adjusting rod 52 is provided to be revolved into the adjusting hole 53, the length of the part passing over the adjusting hole 53 and touching the supporting block 51 is used to provide a flip angle of the reflection sheet 3 for limit adjustment. Besides, the reflection sheet 3 could be flipped by the torsion generated by the second elastic element 221, the angle adjusting mechanism 5 is provided to adjust angle and fasten the reflection sheet 3, so that a user needs not to adjust angle when flipping the reflection sheet 3.

The second embodiment of the lever aseimatic reflection sheet device of the present invention (please refer to FIG. 1 and FIG. 5), including a base 1, a leverage board 2, a counterweight 23 and a reflection sheet 3.

Figure 5:
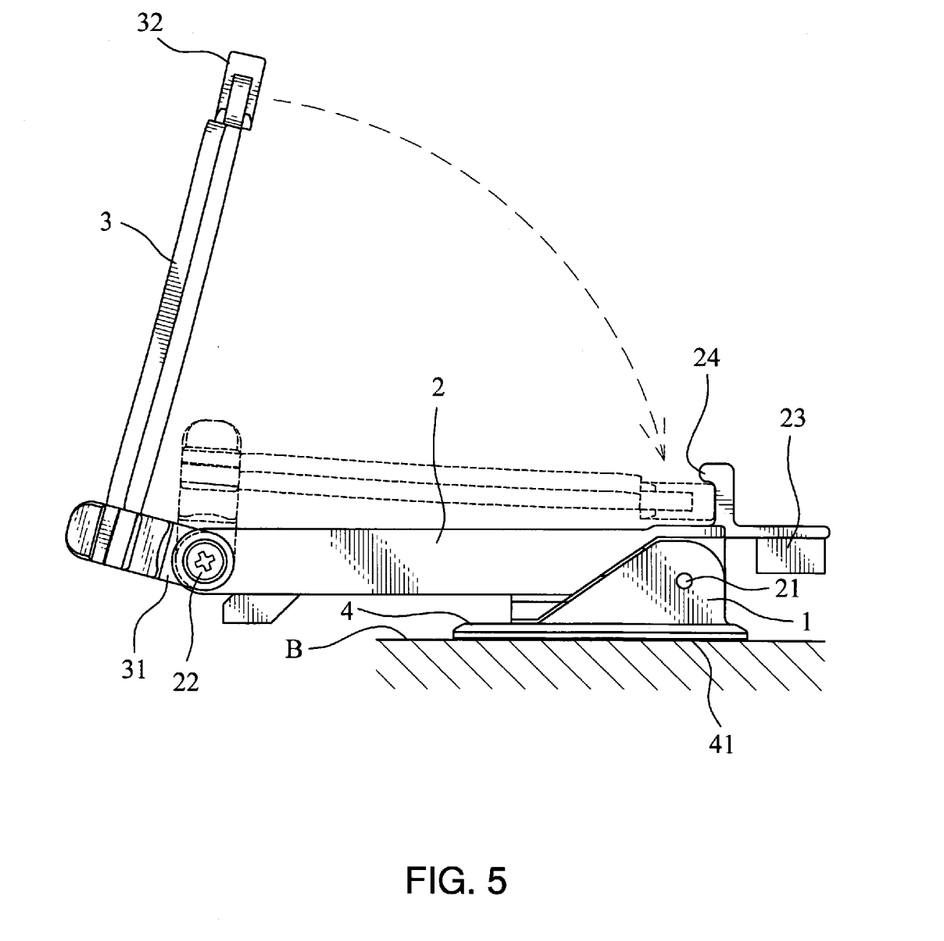
FIG. 5 is a schematic diagram of motion of the second embodiment of the present invention.

The base 1, two corresponding first arms 11 are set on it, a first shaft hole 111 is set on each first arm 11.

The leverage board 2, a second shaft hole 201 is set on its one side, two corresponding second arms 202 are set on another side of the leverage board 2, a third hole 203 is set on the second arm 202. A first shaft group 21 and a second shaft group 22 are set on the leverage board 2, the first shaft group 21 includes a first elastic element 211 and a first shaft 212, the first elastic element 211 is slipped on the first shaft 212, the first shaft 212 is inserted into the second shaft hole 201 on a side of the leverage board 2 and the first shaft hole 111 of the base 1. Two pins 213, 214 of the first elastic element 211 are respectively located between and touched the base 1 and the leverage board 2 to provide elastic torque for rotation, the first elastic element 211 is a torsion spring.

A counterweight, which is set on an end of the leverage board 2, the best installation location could be found by modulating weight and position of the counterweight 23.

The reflection sheet 3 is a translucent and semi-reflective concave mirror, virtual image from the concave mirror may be enlarged and also the virtual image may become farer. A clamping portion 301 is set on the bottom of the reflection sheet 3, multiple first through holes 302 set on the clamping portion 301 is provided to fasten a flipped block 31 on the bottom side of the reflection sheet 3. The flipped block 31 is consisted of a front jaw 311 and a rear jaw 312. A flange portion 313 is extended from a side of the rear jaw 312. A fourth shaft hole 314 is set on the flange portion 313, the second shaft group 22 is provided as a hinge passing through the third shaft hole 203 on another end of the leverage board 2 and the fourth shaft hole 314 of the flipped block 31 on the bottom of the reflection sheet 3. By the elastic torque generated due to vibration of the first elastic element 221, a leverage moment is formed between the leverage board 2 and the flipped block 31 to let the reflection sheet 3 be touched against a windshield W to improve fastening and supporting stability of the reflection sheet. If there is no vibration, no elasticity may be forced on the reflection sheet 3 from the first elastic element 211, thus, deformation of the reflection sheet 3 may be effectively prevented.

The second shaft group 22 includes a second shaft 222, the second shaft 222 is a locking bolt, which may be provided to fasten when adjusting the angle between the reflection sheet 3 and the leverage board 2.

The flipped block 31, multiple second through holes 315 are set on its rear jaw 312, the second through holes 315 are corresponding to internal threads 316 set on the front jaw 311 and the first through holes 302 for a bolt 317 passing through and being fastened, to thereby fix the flipped block 31 on the bottom side of the reflection sheet 3.

The base 1 further includes a base plate 4, the base plate 4 is set on a bottom of the base 1, a double-sided adhesive tap 41 set under the base plate 4 is provided to stick on a dashboard B.

The reflection sheet 3, a damping block 32 is set on its top, which is a soft material. The damping block 32 is fixed on a top side 303 of the reflection sheet 3. The damping block 32 is touched against the windshield W to reduce shaking of the reflection sheet 3.

The length of an end of the leverage board 2 of the present invention may be designed according to usage requirements, and an engagement 24 is set on it. The elasticity of the material of the engagement 24 may provide for the reflection sheet 3 to be folded up and fixed on its top side, and the reflection sheet 3 could be elastically escaped when being opened up.

Figure 6:
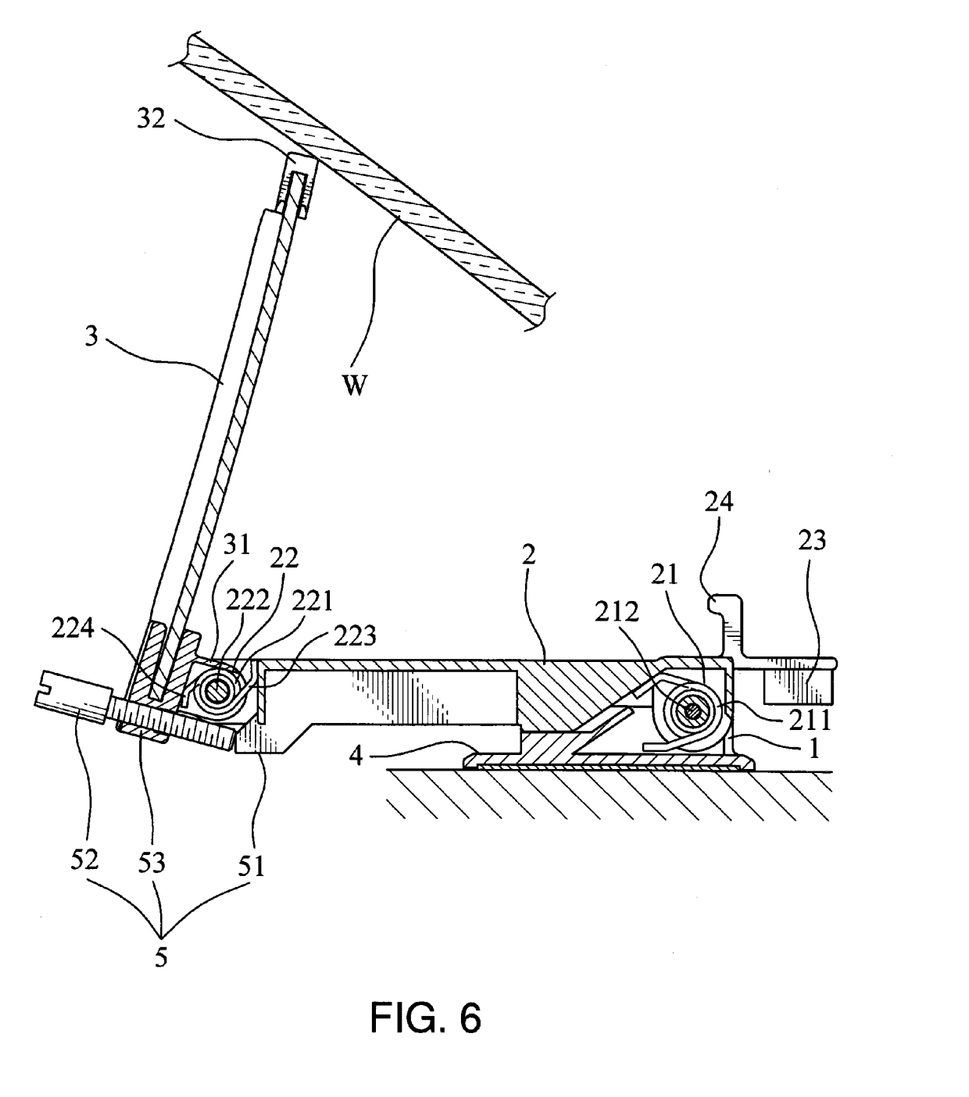
FIG. 6 is a schematic diagram of another example of the second shaft group the second embodiment of the present invention.

As shown in FIG. 6, the lever aseimatic reflection sheet device of the present invention further includes an angle adjusting mechanism 5, the angle adjusting mechanism 5 includes a supporting block 51, an angle adjusting rod 52 and an adjusting hole 53, the supporting block 51 is set on an end of a bottom side of the leverage board 2, the adjusting hole 53 is set on the reflection sheet 3, the angle adjusting rod 52 is provided to be revolved into the adjusting hole 53, the length of the part passing over the adjusting hole 53 and touching the supporting block 51 is used to provide a flip angle of the reflection sheet 3 for limit adjustment. Besides, the reflection sheet 3 could be flipped by the torsion generated by the second elastic element 221, the angle adjusting mechanism 5 is provided to adjust angle and fasten the reflection sheet 3, so that a user needs not to adjust angle when flipping the reflection sheet 3.

As shown in FIG. 6, which is another example of the second shaft group 22, wherein the second shaft group 22 includes a second elastic element 221 and a second shaft 222, the second elastic element 221 is slipped on the second shaft 222, the second shaft 222 is passing through the third shaft hole 203 on an end of the leverage board 2 and the fourth shaft hole 314 of the flipped block 31 on the bottom of the reflection sheet 3, two pins 223, 224 of the second elastic element 221 are respectively touched and located between the leverage board 2 and the flipped block 31 of the reflection sheet 3 to provide elastic torque for rotation, so that aseimatic function of the reflection sheet 3 may be improved, the second elastic element 221 is a torsion spring.

From above embodiments, it could be understood that in the present invention, elastic torque of the first elastic element 211 and the second elastic element 221 is provided to force the reflection sheet 3 to touch against the windshield W with the leverage board 2 used as rotation center of the lever. Also, a counterweight 23 may be further installed on an end of the leverage board 2 that its moment is greater than the moment of another end of the reflection sheet 3 (moment=the distance to the center of gravity×weight). When being shaken on the road, all objects with weight move due to inertia, so there is a downward force generated on the reflection sheet 3 and a downward force generated on another end with the counterweight 23. If center of the lever is fixed, the moment of the counterweight 23 is larger, the downward force on the reflection sheet 3 may be balanced and there is upward excess force. The center of the lever is fixed on the dashboard B, material of the dashboard B usually has a certain extent of softness and weight that there is also downward force on it, so the downward force on the counterweight 23 is needed to be larger to balance the sum of downward forces on the center of the lever and the reflection sheet 3. Therefore, the structure with using lever action according to the present invention may effectively solve the severely shaking problem of the conventional reflection sheet, to improve aseimatic function.

What is claimed is:

1. A lever reflection sheet device, including:
a base;
a leverage board, a first shaft group and a second shaft group are set on the leverage board, the first shaft group includes a first elastic element and a first shaft, the first elastic element is slipped on the first shaft, the first shaft is set on a side of the leverage board and the base, the first elastic element is located between and touched the base and the leverage board to provide elastic torque for rotation;
a reflection sheet, the second shaft group is set between a bottom side of the reflection and another end of the leverage board; and
an angle adjusting mechanism, the angle adjusting mechanism includes a supporting block, an angle adjusting rod and an adjusting hole, the supporting block is set on an end of a bottom side of the leverage board, the adjusting hole is set on the reflection sheet, the angle adjusting rod is provided to be revolved into the adjusting hole, the length of the part passing over the adjusting hole and touching the supporting block is used to provide a flip angle of the reflection sheet for limit adjustment;
wherein the second shaft group includes a second elastic element being a torsion spring and a second shaft.

2. The lever reflection sheet device as claimed in claim 1, wherein the base further includes a base plate, the base plate is set on a bottom of the base, a double-sided adhesive tap set under the base plate is provided to stick on a dashboard.

3. The lever reflection sheet device as claimed in claim 1, wherein a damping block is set on a top side of the reflection sheet, the damping block is provided to touch on a windshield to reduce shaking of the reflection sheet.

4. The lever reflection sheet device as claimed in claim 1, wherein the reflection sheet is a translucent and semi-reflective concave mirror.

5. A lever reflection sheet device, including:
a base;
a leverage board, a first shaft group and a second shaft group are set on the leverage board, the first shaft group includes a first elastic element and a first shaft, the first elastic element is slipped on the first shaft, the first shaft is set on a side of the leverage board and the base;
a counterweight located on an end of the leverage board;
a reflection sheet, the second shaft group is set between a bottom side of the reflection and another end of the leverage board; and
an angle adjusting mechanism, the angle adjusting mechanism includes a supporting block, an angle adjusting rod and an adjusting hole, the supporting block is set on an end of a bottom side of the leverage board, the adjusting hole is set on the reflection sheet, the angle adjusting rod is provided to be revolved into the adjusting hole, the length of the part passing over the adjusting hole and touching the supporting block is used to provide a flip angle of the reflection sheet for limit adjustment.

6. The lever reflection sheet device as claimed in claim 5, wherein an engagement is set on an end of the leverage board for fastening the reflection sheet.

7. The lever reflection sheet device as claimed in claim 5, wherein the base further includes a base plate, the base plate is set on a bottom of the base, a double-sided adhesive tap set under the base plate is provided to stick on a dashboard.

8. The lever reflection sheet device as claimed in claim 5, wherein a damping block is set on a top side of the reflection sheet, the damping block is provided to touch on a windshield to reduce shaking of the reflection sheet.

9. The lever reflection sheet device as claimed in claim 5, wherein the second shaft group is a hinge.

10. The lever reflection sheet device as claimed in claim 5, wherein the second shaft group includes a second elastic element and a second shaft.

11. The lever reflection sheet device as claimed in claim 5, wherein the reflection sheet is a translucent and semi-reflective concave mirror.

12. A lever reflection sheet device, including:
a base;
a leverage board, a first shaft group and a second shaft group are set on the leverage board, the first shaft group includes a first elastic element and a first shaft, the first elastic element is slipped on the first shaft, the first shaft is set on a side of the leverage board and the base, the first elastic element is located between and touched the base and the leverage board to provide elastic torque for rotation;
a reflection sheet, the second shaft group is set between a bottom side of the reflection and another end of the leverage board;
wherein a damping block is set on a top side of the reflection sheet, the damping block is provided to touch on a windshield to reduce shaking of the reflection sheet.

13. The lever reflection sheet device as claimed in claim 12, wherein the base further includes a base plate, the base plate is set on a bottom of the base, a double-sided adhesive tap set under the base plate is provided to stick on a dashboard.

14. The lever reflection sheet device as claimed in claim 12, wherein the second shaft group is a hinge.

15. The lever aseimatic reflection sheet device as claimed in claim 12, wherein the second shaft group includes a second elastic element and a second shaft.

16. The lever reflection sheet device as claimed in claim 12, further includes an angle adjusting mechanism, the angle adjusting mechanism includes a supporting block, an angle adjusting rod and an adjusting hole, the supporting block is set on an end of a bottom side of the leverage board, the adjusting hole is set on the reflection sheet, the angle adjusting rod is provided to be revolved into the adjusting hole, the length of the part passing over the adjusting hole and touching the supporting block is used to provide a flip angle of the reflection sheet for limit adjustment.

17. The lever reflection sheet device as claimed in claim 12, wherein the reflection sheet is a translucent and semi-reflective concave mirror.

\* \* \* \* \*